US012753848B2

(12) United States Patent
Hashim et al.

(10) Patent No.: US 12,753,848 B2
(45) Date of Patent: Oct. 6, 2026

(54) SMART SHUT-OFF VALVE FOR HIGH PRESSURE HOSE

(71) Applicant: SAUDI ARABIAN OIL COMPANY, Dhahran (SA)

(72) Inventors: Rida Bin Hashim, Dhahran (SA); Yusuf Nasidi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/732,341

(22) Filed: Jun. 3, 2024

(65) Prior Publication Data

US 2025/0369528 A1 Dec. 4, 2025

(51) Int. Cl.
*F16K 17/36* (2006.01)
*F16K 17/38* (2006.01)
*G05D 7/06* (2006.01)

(52) U.S. Cl.
CPC .............. *F16K 17/36* (2013.01); *F16K 17/38* (2013.01); *G05D 7/0635* (2013.01); *Y10T 137/0753* (2015.04)

(58) Field of Classification Search
CPC ......... Y10T 137/0753; Y10T 137/0923; Y10T 137/0947; Y10T 137/1842; Y10T 137/1963; F16K 17/38; F16K 17/36; G05D 7/0635
USPC ................................ 137/38, 45, 46, 78.1, 79
See application file for complete search history.

(56) References Cited

U.S. PATENT DOCUMENTS

| | | | | |
|---|---|---|---|---|
| 4,624,390 | A * | 11/1986 | Palmer | F17C 5/06 222/394 |
| 5,279,481 | A * | 1/1994 | Trotter | B64D 1/16 222/64 |
| 5,960,807 | A * | 10/1999 | Reyman | F16K 17/36 137/460 |
| 6,149,071 | A * | 11/2000 | MacCallumMhor | B05B 12/085 239/69 |
| 7,000,465 | B1 * | 2/2006 | L'Bassi | G05D 7/0635 73/204.27 |
| 8,217,795 | B2 | 7/2012 | Carlton-Foss | |
| 9,434,048 | B2 | 9/2016 | Roden | |
| 11,644,353 | B2 * | 5/2023 | Dalberg | G01F 1/684 137/468 |
| 11,680,655 | B1 * | 6/2023 | Fatehi | F16K 17/363 700/282 |
| 2008/0177678 | A1 * | 7/2008 | Di Martini | G06Q 10/06 705/412 |
| 2013/0085443 | A1 * | 4/2013 | Lowery | G01F 1/72 604/65 |
| 2015/0362351 | A1 * | 12/2015 | Joshi | G01F 15/003 700/282 |

(Continued)

FOREIGN PATENT DOCUMENTS

AU 771787 B2 4/2004

*Primary Examiner* — William M Mccalister
(74) *Attorney, Agent, or Firm* — Vorys, Sater, Seymour and Pease LLP

(57) ABSTRACT

A valve system for a hose including a valve operable to open or close a fluid pathway defined in the hose, a sensor operable to sense a condition, a controller electronically coupled to the sensor and operable to determine occurrence of the condition, wherein the controller is configured to direct the valve to close the fluid pathway upon determining occurrence of the condition.

16 Claims, 6 Drawing Sheets

(56) References Cited

U.S. PATENT DOCUMENTS

| | | | | |
|---|---|---|---|---|
| 2016/0061641 | A1* | 3/2016 | Peret | H04N 7/183 73/861.41 |
| 2017/0018928 | A1* | 1/2017 | Castor | H02J 3/381 |
| 2018/0205102 | A1* | 7/2018 | O'Brien | F17C 5/007 |
| 2020/0342985 | A1* | 10/2020 | Toth | A61B 5/308 |
| 2024/0219934 | A1* | 7/2024 | Olaya | G05D 7/0635 |

* cited by examiner

SMART SHUT-OFF VALVE FOR HIGH PRESSURE HOSE

FIELD OF THE DISCLOSURE

The present disclosure relates generally to high pressure hoses and, more particularly, to methods and systems for automatically shutting off high pressure hoses.

BACKGROUND OF THE DISCLOSURE

A variety of industrial applications utilize high pressure fluids. For example, water jet cutting may utilize high pressure water jets to cut materials, and grit blasting may be utilized to roughen and/or smooth surfaces of materials. In both of these example applications, the operator directs a pressurized fluid, potentially carrying solid particles, towards the target surface through a hose. However, such activities have the inherent risk of uncontrolled release of the pressurized fluid from the hose, which may occur if the operator loses grip on the hose, for example, due to the operator losing consciousness or due to operator fatigue. Such uncontrolled release of the pressurized fluid may harm the operator or others surrounding the work area.

To eliminate this risk, existing hoses for such high pressure fluid activities are equipped with safety devices, such as dead-man handle mechanisms. Dead-man handle mechanisms conventionally include a button (or lever) that must be engaged by the operator in order to allow flow from the hose but stops the flow when disengaged. Thus, dead-man handle mechanisms require the operator to continuously apply pressure on the button/handle for prolonged periods, which is generally uncomfortable and may cause muscle strain. As a result, operators often bypass such safety devices, for example, by tying a rope around the button/lever of the dead-man handle mechanisms such that it remains in the engaged position.

Accordingly, methods and systems are desired for ensuring the safety of operators utilizing high pressure hoses and other high pressure equipment.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a valve system for a hose includes a valve operable to open or close a fluid pathway defined in the hose. The valve system also includes a sensor operable to sense a condition, and a controller in communication with to the sensor and operable to determine occurrence of the condition, wherein the controller is programmed to direct the valve to close the fluid pathway upon determining occurrence of the condition.

According to another embodiment, a valve system for a hose includes a base mountable to an exterior surface of the hose and a housing operatively coupled to the base and containing one or more sensors and a controller in communication with the one or more sensors. The valve system also includes a valve mountable to the hose and in communication with the controller, the valve being operable to open or close a fluid pathway of the hose, wherein the one or more sensors are operable to sense a condition of the hose and the controller communicates with the one or more sensors to determine occurrence of the condition, and wherein the controller is programmed to direct the valve to close the fluid pathway upon determining occurrence of the condition.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
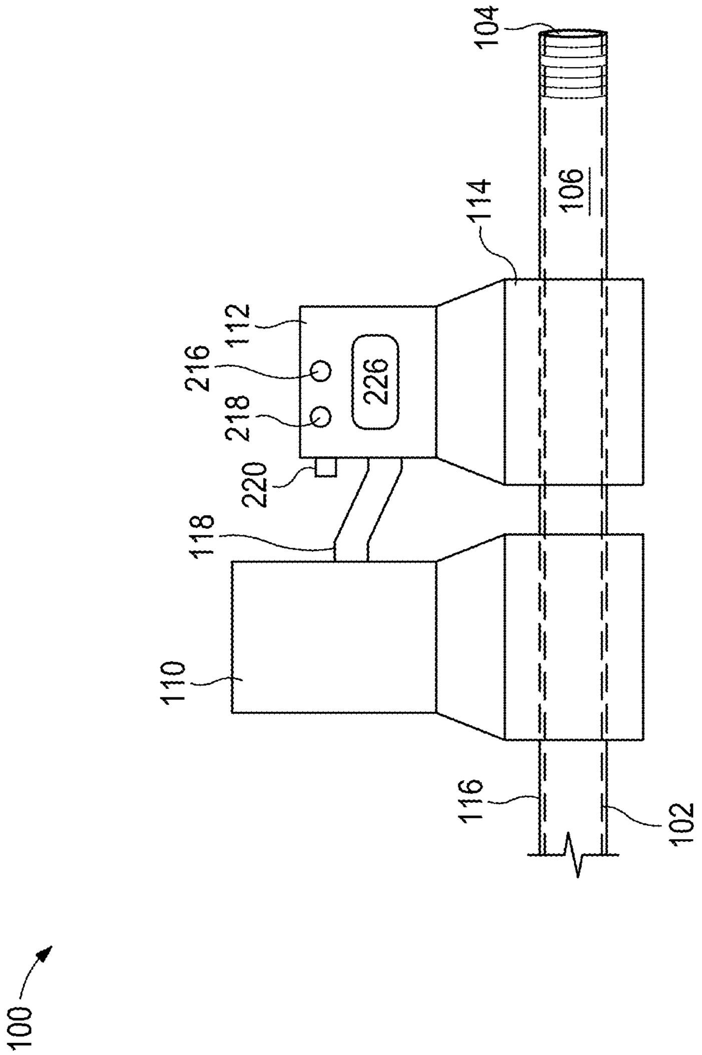
FIG. 1 is a schematic side view of an example valve system, according to one or more embodiments of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to high pressure hoses and, more particularly, to methods and systems controlling use of high pressure hoses. The embodiments disclosed herein include a valve system for a hose. The valve system may include a valve operable to open or close a fluid pathway defined in the hose, a sensor, and a controller configured to direct the valve to close the fluid pathway upon determining occurrence of a predefined condition detected by the sensor. In embodiments, the sensor is at least one of an accelerometer, a gyroscope, and/or a magnetometer, and the valve system further comprises a memory storing instructions that, when executed by the controller, compare data captured by the sensor to a threshold value and cause the valve to close the fluid pathway if the data captured by the sensor exceeds the threshold value.

In embodiments, the sensor is at least one of a temperature sensor and/or a humidity sensor, and the valve system further comprises a memory storing instructions that, when executed by the controller, calculate a heat index value using data captured by the sensor, compare the heat index value to a shutdown threshold value stored in the memory, and cause the valve to close the fluid pathway if the heat index value exceeds threshold value. In such embodiments, a resume operation temperature threshold value may be stored in the memory, and the instructions, when executed by the controller, cause the valve to maintain closure of the fluid pathway until the heat index value calculated by the controller is equal to or less than the resume operation threshold temperature.

In embodiments, the sensor comprises at least a pressure sensor, and the valve system further comprises a memory storing instructions that, when executed by the controller, determine a start time by comparing pressure data captured by the pressure sensor to a threshold pressure value, and cause the valve to close the fluid pathway if the pressure data captured by the pressure sensor exceeds the threshold pressure value for a first predetermined time period. In such embodiments, the instructions, when executed by the controller, may also cause the valve to maintain closure of the fluid pathway for a second predetermined time period.

In embodiments, the valve is a normally closed valve. In such embodiments, the valve system may further include a first power supply for supplying power to the controller and a second power supply for supplying power to the valve, and a relay, wherein the controller is operable to open or close the relay, and the second power source energizes the valve when the relay is closed. Accordingly, the valve system described herein is operable to control use of the hose and ensure that the hose is inoperable if not being under the operator's control or in a dangerous working environment, and ensure that operator is not operating the hose when fatigued.

FIG. 1 is a schematic side view of an example valve system 100, according to one or more embodiments of the present disclosure. The valve system 100 is depicted in conjunction with a hose 102, where the hose 102 includes an outlet 104 and defines an interior passageway 106 that may be opened or closed via the valve system 100. When the interior passageway 106 (alternately referred to as "the fluid pathway 106") of the hose 102 is closed, fluid is inhibited from flowing out of the outlet 104. While the valve system 100 is depicted when utilized with the hose 102, the valve system 100 may be utilized with other types of conduits without departing from the present disclosure.

The valve system 100 includes a valve 110 that is operable to open or close the interior passageway 106 of the hose 102. Thus, the valve 110 may be set to a closed position, in which a seal or "occluding" member (not shown) obstructs the interior passageway 106 such that flow out of the outlet 104 is inhibited, and the valve 110 may be set to an at least partially open position, in which the seal member is oriented such that at least some flow out of the outlet 104 is permitted. In embodiments, the valve 110 is a solenoid valve. In embodiments, the valve 110 is a normally open valve, meaning that the seal member of the valve 110 defaults to (or is biased towards) the open position where flow out of the outlet 104 is permitted, until the valve 110 is activated (energized), wherein activation (energization) of the valve 110 causes the seal member to move (transition) to the closed position. In other embodiments, the valve 110 is a normally closed valve, meaning that the seal member of the valve 110 defaults to (or is biased towards) the closed position where flow out of the outlet 104 is inhibited, until the valve 110 is activated (energized) and such activation (energization) of the valve 110 causes the seal member to move (transition) to the at least partially open position.

The valve system 100 may also include a housing 112 within which at least some of the electronic components of the valve system 100 are housed. In the illustrated embodiment, the valve system 100 also includes a base 114 upon which the housing 112 is mounted. Here, the base 114 is provided on (secured to) an exterior surface 116 of the hose 102. In particular, the base 114 may provide or define a mounting surface on which the housing 112 can be mounted. The base 114 defines a bore through which the hose 102 extends, such that the hose 102 extends through the base 114 and the base 114 extends at least partially about the hose 102. In embodiments, the housing 112 is removably mounted on the base 114, for example, the housing 114 may be magnetically attached to the base 114 or attached to the base 114 via mating threads or a mechanical interface (e.g., bolted engagement).

Also in the illustrated embodiment, the valve system 100 includes a bridge 118 extending between the valve 110 and the housing 112. The bridge 118 defines an internal passageway through which wiring and/or other electrical components may extend, for example, to operably couple internal components of the valve 110 to the electronic components housed within the housing 112. In embodiments, the bridge 118 is a flexible coupling member (i.e., made from a flexible material) that allows for relative movement between the housing 112 and the valve 110 that may occur due to the flexibility of the hose 102. In other embodiments, the bridge 118 may comprise a rigid coupling member.

Figure 2:
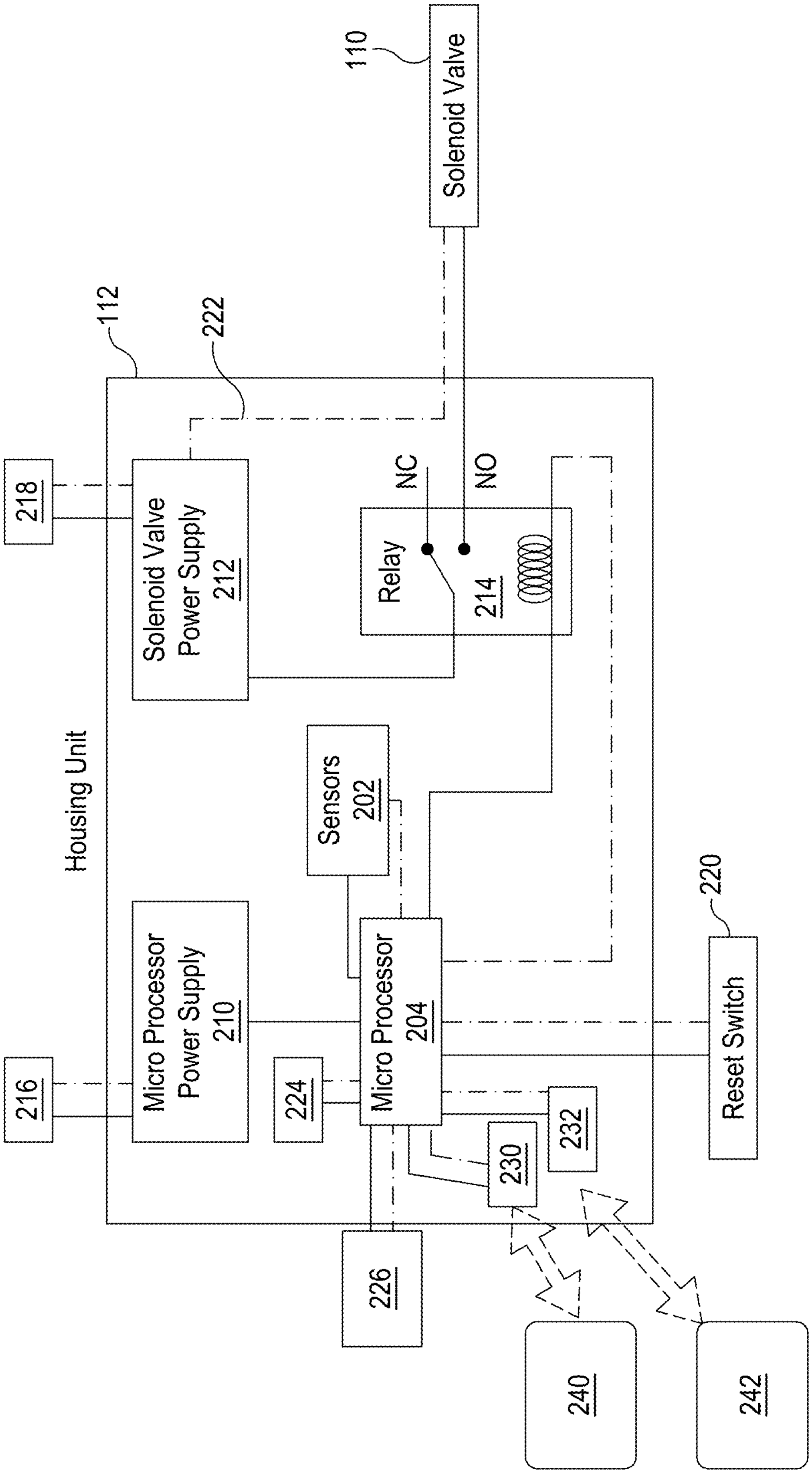
FIG. 2 schematically depicts an example electronic package within a housing of the valve system of FIG. 1, according to one or more embodiments of the present disclosure.

FIG. 2 schematically depicts an example electronic package that may be contained within the housing 112 of the valve system 100 of FIG. 1, according to one or more embodiments of the present disclosure. As shown, the valve system 100 includes at least one sensor 202 and a controller 204 (e.g., a micro processor). The sensor(s) 202 may be operable to sense a condition (e.g., a predefined condition), and the controller 204 may be electronically (communicably) coupled to the sensor 202 and the valve 110. The controller 204 may be configured to direct the valve 110 to close (or open) the interior pathway 106 (FIG. 1) upon detection of the condition.

The sensor 202 and the controller 204 are housed or disposed within the housing 112. However, as shown in FIG. 2, the valve system 100 (FIG. 1) may include additional electrical components that are also at least partially housed/disposed within the housing 112. For example, in the illustrated embodiment, the valve system 100 further includes a first power supply 210 for supplying power to the controller 204, a second power supply 212 for supplying power to the valve 110, and a relay 214 housed (enclosed or contained) within the housing 112. In embodiments, the first power supply 210 and/or the second power supply 212 may be configured to be turned "on" or "off" as desired, for example, a first switch 216 may be operably connected to the first power source 210 for switching the first power source 210 "on" or "off" and a second switch 218 may be operably connected to the second power source 212 for switching the second power source 210 "on" or "off".

In addition, the valve system 100 may include a reset switch 220 operably coupled to the controller 204. As shown in FIG. 1, the first and second switches 216, 218 and the reset switch 220 may be supported by the housing 112 and protrude therefrom such that an operator may manually activate them when holding the hose 102 during use.

In the illustrated example, the valve 110 and the second power supply 212 are connected together via a circuit loop 222, and the relay 214 is arranged in the circuit loop 222 and operable to open or close the loop 222. When the relay 214 is deactivated, as depicted in FIG. 2, the circuit loop 222 is open and the second power supply 212 is not powering the valve 110. However, when activated, the circuit loop 222 is closed such that the second power supply 212 is able to supply power to the valve 110. In this example, the valve 110 is a normally closed valve, such that the valve 110 closes the interior passageway 106 of the hose 102 when deactivated (i.e., when not receiving power from the second power supply 212) and such that the valve 110 at least partially opens the interior passageway 106 of the hose 102 when activated (i.e., when receiving power from the second power supply 212). Thus, activation of the relay 214 causes the second power supply 212 to supply power to the valve 110, which in turn activates the valve 110 and causes the valve 110 to at least partially open the interior passageway 106 of the hose 102.

In some embodiments, the valve 110 only receives power from the second power supply 212 when the relay 214 is activated, and the controller 204 is operable to activate (close) the relay 214 to thereby close the circuit loop 222. Thus, the controller 204 is operable to cause the second power supply 212 to supply power to the valve 110 to thereby open the interior passageway 106 of the hose 102. As shown, the controller 204 is connected to the first power supply 210, the sensor 202, and to the reset switch 220. Activation of the first switch 216 turns on the first power supply 210, thereby allowing the first power supply 210 to supply power to the controller 204 and, once activated (turned on), the first power supply 210 will continuously send power through the relay 214, thereby activating the relay 214, and thereby ensuring that power from the second power supply 212 reaches the valve 110.

According to embodiments of the present disclosure, the controller 204 may be programmed with an algorithm that detects occurrence of a condition based on data from the sensor(s) 202. If the algorithm embedded within the controller 204 detects (determines) occurrence of the condition, the controller 204 may then be programmed to cut power to the relay 204, which in turn opens the relay 214 and opens the circuit loop 222 such that the second power source 212 is unable to supply power to the valve 110, which will close the passageway 106 of the hose 102. To restore power to the relay 214 to thereby close the circuit loop 222 and thereby allow the second power supply 212 to supply power to the valve 110, the reset switch 220 may be activated to return the controller 204 to its normal operation.

The controller 204 may include a memory 224 that may store computer readable instructions, such as one or more algorithms as further described below. The controller 204 may execute (run) such computer readable instructions and, when executing such instructions, the controller 204 may utilize data received from the sensor(s) 202 in order to determine occurrence of the condition, and the controller 204 may direct the valve 110 to close the interior pathway 106 upon determining occurrence of the condition. The memory 224 may also store operational data concerning usage of the valve system 100 and whether the condition occurred, such as the total time the valve system 100 was operated during a given time period, the number of breaks/rests taken by the operator during a time period, the ambient temperature encountered during usage of the valve system 100 (including maximum ambient temperature encountered), and whether the valve system 100 encountered any impacts or safety incidents. By storing such operational data on the memory 224, operators may later recall such operational data when evaluating usage of the valve system 100 at a later date/time.

In some embodiments, the condition to be sensed by the sensor(s) 202 and determined by the controller 204 may be a "fall condition", for example, where the operator loses control of the hose 102 and/or where the hose 102 falls to the ground. Thus, the valve system 100 may be equipped with fall detection capabilities, whereby the controller 204 causes the valve 110 to close the interior passageway 106 of the hose 102 upon detecting that the hose 102 has fallen. In other embodiments, or in addition thereto, the condition to be sensed by the sensor 202 and determined by the controller 204 may be an "unsafe temperature condition", for example, where the hose 102 is being utilized in an environment subject to unsafe operating temperatures. Thus, the valve system 100 may be equipped with temperature detection capabilities, whereby the controller 204 causes the valve 110 to close the interior passageway 106 of the hose 102 upon detecting that the hose 102 is located in an environment exhibiting unsafe operating temperatures. In yet other embodiments, or in addition to detecting a fall condition and/or an unsafe temperature condition, the condition to be sensed by the sensor 202 and determined by the controller 204 may be a predetermined time interval that the operator may work before they must take a break (i.e., a "time interval condition"), for example, to ensure that the operator is not continuously using the hose 102 for unsafe periods of time that may result in operator fatigue and to otherwise ensure that the operator is taking breaks at required/recommended intervals. Thus, the valve system 100 may be equipped with a timer and pressure detection capabilities to allow for detection of when the hose 102 is being utilized and for how long, whereby the controller 204 causes the valve 110 to close the interior passageway 106 of the hose 102 upon detecting that the hose 102 has been continuously operated for a certain period of time (e.g., as mandated by a government agency or law). In embodiments, the controller 204 includes the timer.

The sensor 202 may include more than one sensor and/or more than one type of sensing capability, and the type of sensor(s) utilized depends on type of algorithm stored in the controller 204 (e.g., for detecting the fall condition). In addition, the type of sensor(s) utilized may also depend on the metrics of the additional metrics concerning de-energization of the relay 214. In embodiments where the valve system 100 is configured to detect a fall condition, the sensor 202 may include at least an accelerometer and, in some embodiments, the sensor 202 may also include a gyroscope and a magnetometer. In embodiments where the valve system 100 is configured to detect an unsafe temperature condition, the sensor 202 includes at least a temperature sensor and, in some embodiments, the sensor 202 also includes a humidity sensor. In embodiments where the valve system 100 is configured to detect a time interval condition, the sensor 202 may include at least a pressure sensor and a timer. In embodiments where the sensor 202 includes a plurality of sensors, as described above, one or more of the sensors may be integrated into a single sensor chip or a plurality of sensor chips may be utilized. Regardless of the number and type of sensor(s) 202 utilized, the sensor(s) 202 may be configured to take readings at various frequencies (intervals), for example, the sensor 202 may continuously take readings or take readings every minute, etc.

The valve system 100 may also include a display 226. The display 226 may be mounted on the housing 112 such that it is visible to the operator holding the hose 102. In embodiments, the display 226 is a liquid-crystal display (LCD). The display 226 may be utilized by the operator to determine the reason why the valve 110 closed the interior passageway 106, and may also help facilitate troubleshooting. For example, if the sensor 202 senses that the hose 102 has fallen or that the operator has lost control of the hose 102 and the controller 204 has closed the valve 110 in response thereto, the controller 204 may cause the display 226 to indicate that the valve 110 is has been closed because a fall condition has been detected. Alternatively, or in addition thereto, if the sensor 202 senses that the hose 102 is being operated in an environment exhibiting unsafe operating temperatures and the controller 204 has closed the valve 110 in response thereto, the controller 204 may cause the display 226 to indicate that the valve 110 has been closed because an unsafe temperature condition has been detected.

In one example, where the valve system 100 is configured to detect the time interval condition, the display 226 may comprise a seven-segment display affixed on top of the housing 112. Here, the total time period that the operator may work before taking a break may be programmed within the controller 204 and the display 226 is operable to show the time remaining (i.e., a countdown) from the total time period until the controller 204 will cause the valve 110 to close. For example, prior to beginning use of the hose 102, the display 226 may show "0.0.0.0", indicating that operation of the hose 102 is allowed in the present moment. Once the operator begins using the hose 102, the hose 102 becomes pressurized, which may be detected by the sensor (s) 202 (e.g., when the sensor 202 includes a pressure sensor). The controller 204 utilizes data from the sensor 202 to determine that operation of the hose 102 has begun and the controller 204 begins running an algorithm stored in the controller 204, during which time the controller 204 causes the valve 110 to open the interior passageway 106 of the hose 102. The controller 204 runs the algorithm and continues to allow the valve 110 to remain in the open position, during which time the display 226 will continue displaying "0.0.0.0". However, when the controller 204 determines that the hose 102 has been operated for the predetermined time interval (i.e., a first predetermined time period), the controller 204 causes the valve 110 to close the interior passageway 106 as detailed above. This will force the operator to stop using the hose 102 (i.e., such that the operator can take a break/rest). Stated differently, the controller 204 causes the valve 110 to close the interior passageway 106 upon determining that the time interval condition has been satisfied.

Further, once the controller 204 has determined that the hose 102 has been operated for the predetermined time interval, the controller 204 maintains the valve 110 in the closed position and causes the display 226 to show an amount of time that the valve 110 will remain closed (i.e., a predetermined break period). The operator that the hose 102 may not be used for this predetermined break period and the operator may take a break/rest during this time. Thus, the algorithm executed by the controller 204 maintains closure of the valve 110 for the predetermined break period (i.e., a second predetermined time period). For example, the display 226 may show "3.0.0.0", indicating that the hose 102 is not allowed to operate for the next 30:00 minutes. Once the controller 204 determines that the valve 110 has been closed for the predetermined break period, the controller 204 allows the valve 110 to be opened once again such that the hose may thereafter be utilized. In addition, the display 226 may depict a count down and update each second until it reaches "0.0.0.0" indicating that operation of the hose 102 is permitted again.

In some embodiments, the valve system 100 may also include a transceiver 230 operable to permit communication between the valve system 100 and external systems at other (remote) locations. For example, the transceiver 230 may enable the valve system 100 to communicate with a central monitoring system 240 at another location (e.g., emergency responders, a monitoring station, a designated official/employee/supervisor, etc.). In such embodiments, the valve system 100 may communicate to the external location that a condition has occurred causing the controller 204 to close the valve 110.

In embodiments, the valve system 100 also includes a global positioning system (GPS) receiver 232 operable to determine location of the valve system 100. In such embodiments, in addition to closing the valve 110 upon detecting a condition, the controller 204 is operable to generate an emergency alert upon detecting such condition, and the valve system 100 utilizes the transceiver 230 to send the emergency alert to first responders (e.g., located at the external location associated with the central monitoring system 240) along with the location of the valve system 100 (as determined by the GPS receiver 232) such that emergency responders can reach to the operator location promptly for assistance.

In embodiments, the valve system 100 may be integrated within a Supervisory Control and Data Acquisition (SCADA) system. Typical SCADA systems may track several safety and operational metrics, such as $H_2S$ alarm status, lower explosive limit (LEL) alarm status, well shut-down/operational status, etc. Thus, in embodiments, the valve system 100 may be in communication with the SCADA system, such that the status of the valve system 100 is sent to the SCADA system. In this manner, the SCADA system will also monitor the status of the valve system 100 as another safety metric.

The status tracked by the SCADA system may be the same as what is displayed on the display 226, or the status received by the SCADA system from the valve system 100 may be different than what is shown on the display 226. For instance, a SCADA alarm can be sent to the console operator of the SCADA system if a fall was detected by the valve system 100, prompting the console operator to call/check-in with the user of the valve system 100. This allows prompt emergency action as needed, and is especially relevant in situations where a large number of the valve system 100 are being used.

Furthermore, it might be useful for the SCADA system to collect operational metrics of the valve system 100, such as the total time each valve system 100 was pressurized. For instance, during testing & inspection activities within a plant where a large number of the valve systems 100 are being used, the total operational time for each of the valve systems 100 may be a useful key performance indicator (KPI), which can be optimized. As an example, it might be noticed that operational time of the valve system 100 was lower in certain activities as compared to when the valve system 100 was used in other activities. After noticing this discrepancy in operational times, a closer investigation may be undertaken to determine the cause of such discrepancy and then corrective actions may be thereafter implemented to address the cause(s) of the discrepancy.

Furthermore, where multiple valve systems 100 are utilized and in communication with the SCADA system, the SCADA system may be utilized to aggregate and store operational data from all of the valve systems connected to the SCADA system, which may be utilized to optimize the fall detection algorithm. For example, the data received from the various valve systems 100 may be utilized to train the fall detection algorithm.

In embodiments, the valve system 100 is integratable with an external device 242, such as a computer, a smart phone, a wearable device (e.g., smart watch, safety vest), etc. In these embodiments, the external device 242 may be configured to capture data about the operator of the hose 102, such as their heart rate and or body motion. The valve system 100 may communicate with the external device 242 such that the valve system 100 receives the data captured by the external device 242, and such that the algorithm executed by the controller 204 may be designed to also evaluate such data when running its designed safety protocol. For example, the algorithm may be designed to cause closure of the valve 110 if the controller 204 determines that the operator is having an adverse health condition (e.g., a heart attack), which may be indicated by the data received from the external device 242. In other examples, the valve system 100 receives various types of health and/or biometric parameters from the external device for recording/logging of such health and/or biometric parameters. Such logged/recorded data may be useful in situations where medical investigations occur following an event where the operator was harmed during use of the valve system 100. Alternatively, or in addition thereto, the various types of health and/or biometric parameters received by the valve system 100 (from the external device) may be utilized to train a fall detection algorithm to the extent there is a correlation between certain health data and a safety incident (such as a fall).

In embodiments, the valve system 100 is configured to allow opening of the valve 110 only when an authorized user is operating the hose 102. Here, for example, the external device 242 may be a plurality of external devices that are each associated with a different user, the memory 224 of the valve system 100 may include information indicating which of the different users is an authorized user, and the valve system 100 may be further configured to only permit use of the hose 102 (i.e., cause opening of the valve 110) when paired with the external device 242 associated with the authorized user. For example, the controller 204 will cause the valve 110 to be opened only upon determining that the external device 242 is associated with an authorized user.

In embodiments, data gathered and evaluated by the valve system 100 may be recorded or logged. For example, the central monitoring system 240 may be configured to record or log data received from the valve system 100. Data gathered from the external device 242 (e.g., the wearable devices) and the valve system 100 may be securely logged for subsequent analysis. This comprehensive data archive can be utilized to scrutinize operator behavior patterns, identify potential risk factors concerning use of the hose 102, and implement necessary enhancements to ensure superior performance and safety of the hose 102. The logged data also poses as a valuable asset for constructing advanced predictive models/algorithms, thereby improving the aptitude of the valve system 100 in preempting accidents before they occur.

Figure 3A:
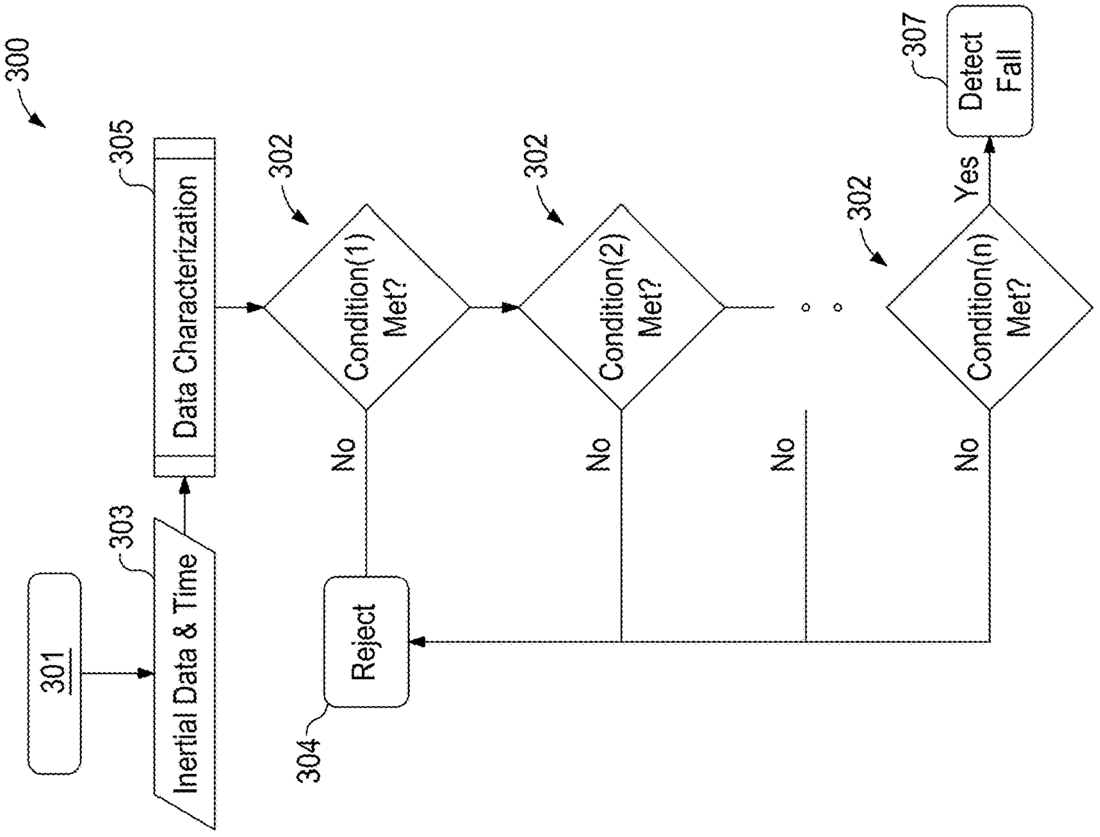
FIGS. 3A and 3B illustrate example algorithms that may be utilized by the valve system of FIGS. 1-2, according to one or more embodiments of the present disclosure.
Figure 3B:
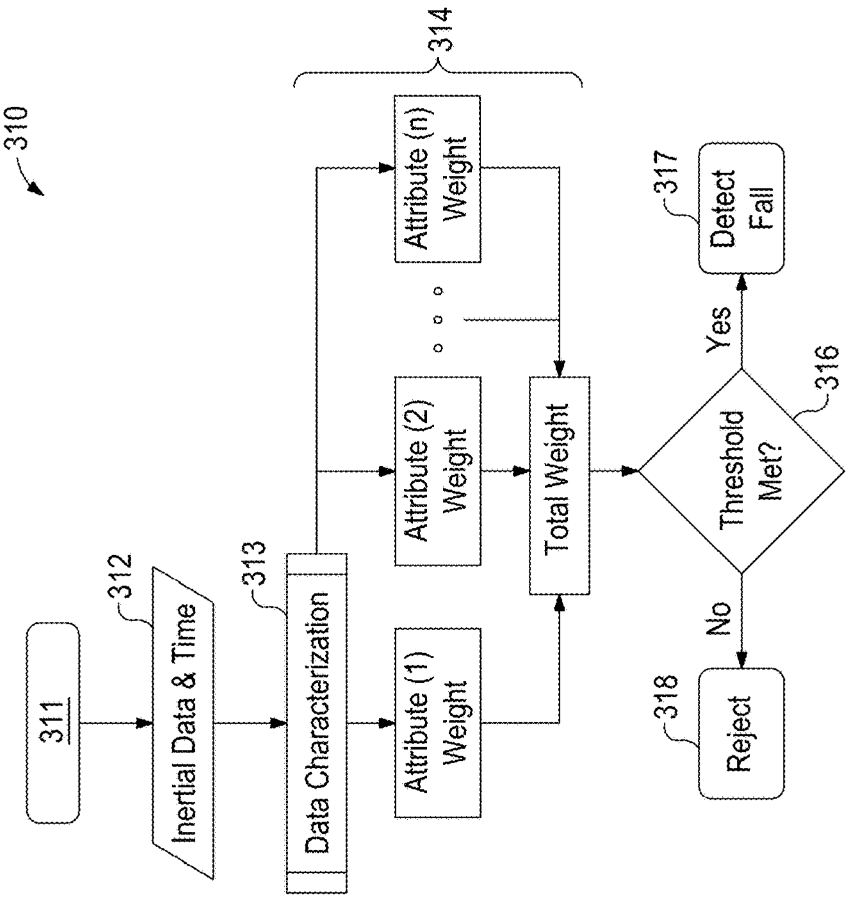

FIGS. 3A and 3B illustrate example algorithms that may be executed by the controller 204 to detect the fall condition, according to one or more embodiments of the present disclosure. As previously mentioned, the valve system 100 may be configured to close the valve 110 upon detecting that the hose has fallen (i.e., a fall condition), to thereby prevent uncontrolled release of fluid from the outlet 104 of the hose 102. Detection of the fall condition is implemented using at least the sensor 202, however, the type and number of sensors 202 utilized may depend on the type of algorithm programmed into the controller 204.

FIG. 3A depicts a method 300 for detecting the fall condition utilizing a threshold-based algorithm, according to one or more embodiments of the present disclosure. The method 300 begins at 301, wherein the inertial data is captured by the sensor 202, as indicated at 303, after which the inertial data are communicated to the controller 204 to process the data through characterization, as indicated at 305. In embodiments, the controller 204 is configured to time-stamp each bit of inertial data or associate the inertial data with a time. In other embodiments, the inertial data received by the controller 204 may already be time-stamped, such as by the sensor 202. The inertial data is the input utilized by the threshold-based algorithm at 305. When the inertial data is fed into the threshold-based algorithm at 305, the threshold-based algorithm characterizes the inertial data, and the characterization includes analyzing the sensor data to extract values of relevant features, as detailed below with reference to FIG. 4.

The threshold-based algorithm includes several thresholds/conditions 302 that must be met to determine that the fall condition has occurred, as indicated at 307 (i.e., "Detect Fall"). Stated differently, the controller 204 must determine whether the relevant features identified in the data satisfy the thresholds/conditions 302 and, if each of the conditions 302 is satisfied, the controller 204 determines that a fall condition has occurred, as at 307. If any one of the conditions 302 is not met with respect to the relevant features identified in the sensor data, the threshold-based algorithm instructs the controller 204 that the fall condition has not occurred, as indicated at 304.

The number of conditions 302 utilized by the threshold-based algorithm may or may not depend on the number of sensors 202 utilized. For example, where the sensor 202 includes just an accelerometer, the threshold-based algorithm may include just one condition 302, wherein the condition 302 is whether the acceleration sensed by the sensor 202 exceeds a minimum value that would be indicative of the fall condition and, if so, the controller 204 causes the valve 110 to close. However, the threshold-based algorithm may incorporate more than one condition 302 for each sensor 202. For example, where the sensor includes just the accelerometer, the threshold-based algorithm may check whether the value of the relevant feature in the sensor data is below a certain threshold, whether the value of another feature in the sensor data is above a certain threshold, whether a timer period associated with a feature of the sensor data is exceeds a certain threshold, etc. In yet another example where the sensor 202 includes an accelerometer and a gyroscope, the threshold-based algorithm may include two conditions 302, with the first condition 302 being satisfiable based on data received from the accelerometer and the second condition 302 being satisfiable based on data received from the gyroscope, and satisfaction of both of the conditions 302 indicates occurrence of the fall condition at 307; however, in other embodiments the sensor data obtained from each of the sensors in this example may be associated with more than one condition 302. Even a further example where the sensor 202 includes an accelerometer, a gyroscope, and a magnetometer, the threshold-based algorithm may include three conditions 302, with the first condition 302 being satisfiable based on data received from the accelerometer, the second condition 302 being satisfiable based on data received from the gyroscope, and the third condition 302 being satisfiable based on data received from the magnetometer, and satisfaction of all three of the conditions 302 indicates occurrence of the fall condition at 307. However, in other embodiments the sensor data obtained from each of the sensors in this example may be associated with more than one condition 302.

Moreover, the conditions 302 associated with each sensor 202 are not necessarily independent, which means that adding another sensor 202 may not increase the number of conditions 302, but such addition may change what the conditions are. For instance, when adding a gyroscope and a magnetometer to the accelerometer, the condition 302 associated with a relevant feature in the sensor data can change. For example, instead of just checking whether the value of the relevant feature in the sensor data exceeds a threshold acceleration value, the check can now become whether the value of the relevant feature exceeds the acceleration threshold and that the orientation of the valve system 100 has changed in a predetermined time period leading up to measurement of the relevant feature, wherein orientation is determined based on both the gyroscope and magnetometer readings. In this example, the accelerometer and the other sensors are not used independently since the predetermined time period has to be determined from the relevant feature obtained from data received from the accelerometer.

FIG. 3B depicts a method 310 for detecting the fall condition using a machine learning algorithm, according to one or more embodiments of the present disclosure. The method 300 begins at 311, where the inertial data is captured by the sensor 202, as indicated at 312, after which the inertial data are communicated to the controller 204, as indicated at 313. In embodiments, the controller 204 is configured to time-stamp each bit of inertial data or associate the inertial data with a time; whereas, in other embodiments, the inertial data received by the controller 204 is already time-stamped, such as by the sensor 202. The inertial data is the input utilized by the machine learning algorithm at 313. When the inertial data is fed into the machine learning algorithm at 313, the machine learning algorithm characterizes the inertial data, and the characterization includes analyzing the sensor data to extract values of relevant features. The machine learning algorithm not only extracts values from the relevant features at 313, but the machine learning algorithm may also attribute/assign a weight to the relevant feature, which is generally resolved at 314, and the machine learning algorithm may also attribute/assign a threshold value to the relevant feature, which is generally resolved at 316. The weight assigned to the value of a relevant feature may represent how critical that type of data is for determining a fall, for example, a higher weight is given to more important conditions/attributes.

The machine learning algorithm can be trained on a set of fall data, with the fall data being of the same/similar type of data gathered by the one or more sensors 202, and such training may be performed to ascertain/identify threshold values and weights utilized for determining fall conditions. The valve system 100 need not store the training data, but may instead store just the weights and the threshold values that were determined during the training process. Alternatively, the training data may be saved within the valve system 100, and the training algorithm can be periodically run on the valve system 100 utilizing both the training set and historical operational data. Specifically, there will be false fall conditions detected during operation and there will be some true fall conditions detected during operation; and, if the sensor data were recorded for these true and false detected fall conditions and if such incidents were tagged as either a true fall or a false fall, then the machine learning can train on such true and false fall conditions to optimize the attribute weights and threshold value.

Another approach for continuous optimization is to perform such optimization outside of the valve system 100. For example, the operational data of all valve systems 100 can be aggregated within a SCADA system, tagged, and then utilized as a larger training set; and any new attribute weights and/or threshold values obtained via training with the larger training set may then be communicated to the controller 204 of any one or more of the valve systems 100 tied into the SCADA system. The method 310 need not utilize such continuous optimization, however, as the initial weights and threshold values trained into the machining learning algorithm may be sufficient. Regardless, the controller 204 will weight the values of relevant features, as at 314, then determine occurrence of the fall condition based on whether the weighted value satisfies/meets the threshold value requirement, as at 316. If so, the controller 204 may determine that the fall condition has occurred as at 317; however, if not, the controller 204 determines that the fall condition has not occurred as at 318.

Figure 4:
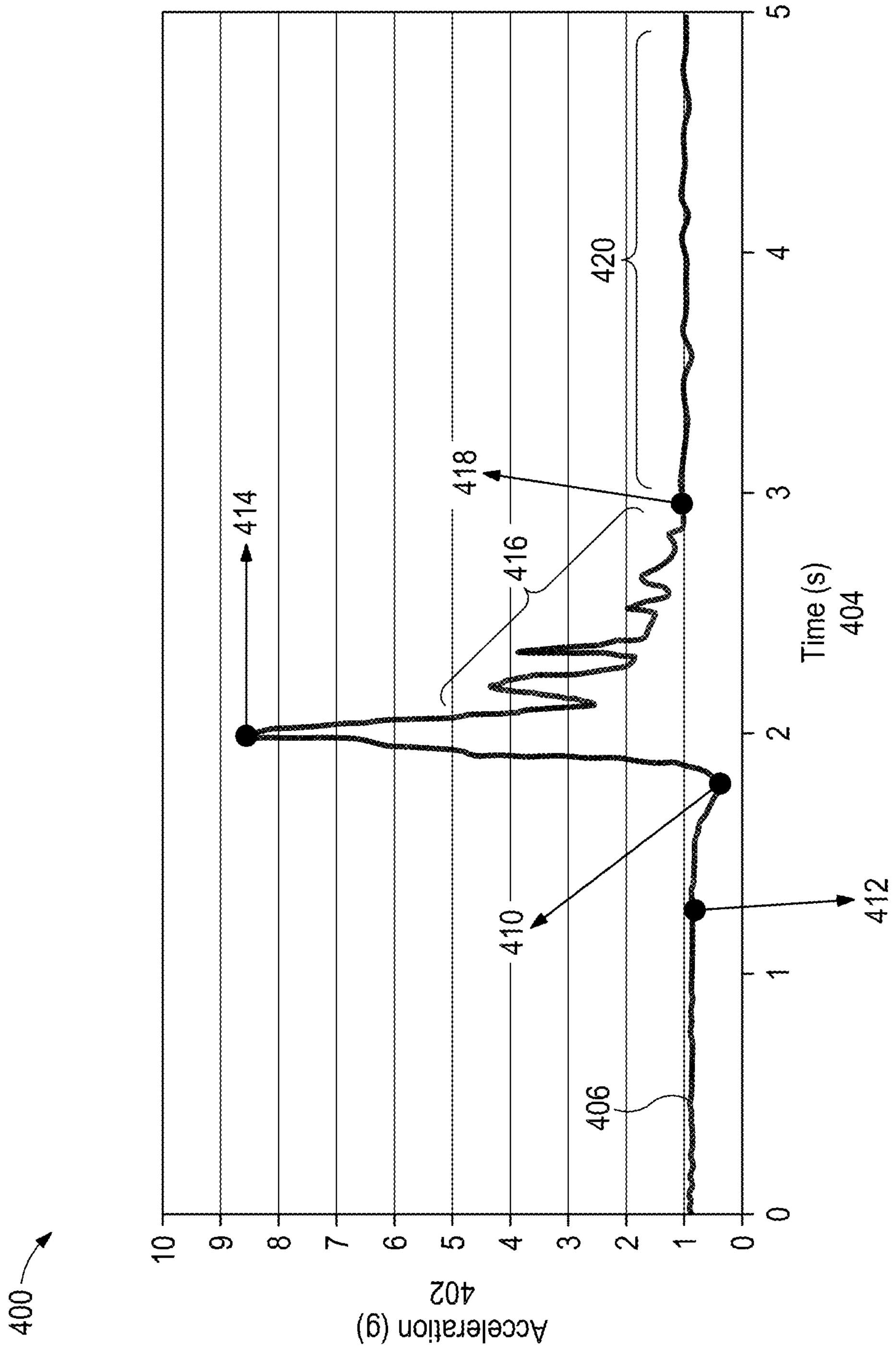
FIG. 4 depicts acceleration data captured by the valve system of FIGS. 1-2 that are indicative of a fall condition, according to an example.

FIG. 4 depicts example acceleration data captured by the sensor 202, according to an example. In particular, FIG. 4 is a data set/graph 400 plotting acceleration 402 over time 404 for an example fall condition 406, and an algorithm may be designed to determine occurrence of a fall condition by comparing data captured by the sensor 202 to certain features of the data set 400 of the example fall condition 406. For example, the algorithm could check whether the readings from the sensor 202 over a specific time period are consistent with features of the example fall condition 406. As shown, the example fall condition 406 includes a minimum reading 410, which is indicative of a free fall that began at a deceleration indicated at 412; a maximum reading 414, which is indicative of an impact; a high variability of readings 416 directly after the maximum reading 414 and ending at 418, which is followed by generally stable readings 420 for an extended period of time. The algorithm may compare the data captured by the sensor 202 to certain features of the example fall condition 406, such as the minimum reading 410 immediately followed by the maximum reading 414 and the high variability of readings 416, and if the readings captured by the sensor 202 were of sufficient magnitude and lasted for similar amounts of time, the controller 204 executing such algorithm may determine that the fall condition has occurred and cause the valve 110 to close the interior passageway 106.

Thus, the valve system 100 may utilize data, such as the data shown in the graph 400, when implementing algorithms that detect fall conditions. With regard to the threshold-based algorithm of FIG. 3A, the threshold-based algorithm characterizes the inertial data received from the sensor(s) 202 in order to extract values of relevant features, and such relevant features may include any one or more of the deceleration 412, the minimum reading 410, the maximum reading 414, the high variability of readings 416, the ending 418 of the high variability of readings 416, and the generally stable readings 420. For example, the characterization of data, indicated at 305, may include analyzing the sensor's 202 data to extract the values of the relevant features.

Here, the controller 204 may continuously monitor data received from the sensor 202 in order to determine the maximum reading (corresponding to the maximum reading 414) and minimum reading (corresponding to the minimum reading 410) in the previous 5 second window of such data received from the sensor 202, the controller 204 continuously checks for erratic behavior in the data received from the sensor 202 (corresponding to the high variability of readings 416) following the maximum reading, and the controller 204 continuously checks the data received from the sensor 202 for the length of the stability period (corresponding to the generally stable readings 420) following the erratic period if one exists. To the extent that any additional sensors 202 may be included, additional analysis may be performed on the data received from such other sensors, if any, in a similar manner, depending on the sensors themselves and the type of the fall detection algorithm. Then, the threshold-based algorithm instructs the controller 204 to compare the value of the relevant features/readings with the threshold values, as indicated at 302, and determines at 307 that a fall condition has occurred if all the conditions are satisfied. For example, the controller 204 could compare sensor data corresponding with the minimum reading and verify that its value is less than or equal to a threshold value of the minimum reading 410, and compare sensor data corresponding with the maximum reading to verify that its value is greater than or equal to a threshold value of the maximum reading 414, and if both of those conditions (i.e., the conditions 302) are satisfied, the controller 204 may determine that the fall condition has occurred. But, with the threshold-based algorithm, if one of the conditions is not satisfied/met, the controller 204 will no determine occurrence of the fall condition, as shown at 304.

Regarding the machine learning algorithm of FIG. 3B, the controller 204 may still determine occurrence of the fall condition even if the sensor data fails to satisfy one or more of the conditions. Stated differently, failure of the sensor data to satisfy all of the conditions does not necessarily lead to a rejection of a fall condition when using the machine learning algorithm. For instance, given the shape and weight of the valve system 100, it may be the case that sensor readings that, when characterized by the controller 204, approximate an erratic period (corresponding with the high variability of readings 416) are not associated with actual fall conditions. Therefore, the condition associated with such erratic period may be assigned a relatively lower weight than other features of the sensor data, as providing a feature with a lower weight decreases that feature's influence on the total weight, which may lead to detecting a fall if other conditions/attributes are met. For example, features such as the maximum reading and the minimum reading preceding the maximum reading may be more indicative of an actual fall condition and therefore assigned relatively higher weights, and the weighted value of the erratic period added to the weighted value of the minimum reading and/or weighted value of the maximum value to calculate the total weight, and if the total weight satisfies the threshold, at 316, the controller 204 may determine occurrence of the fall condition, at 317; whereas, if the total weight does not satisfy the threshold, the controller 204 does not determine occurrence of the fall condition, at 318. Also, high weights may be assigned to certain features that tend to be indicative of the fall condition, such as the maximum reading 414, which may help guarantee that they satisfy the threshold and, moreover, assigning such high weights to certain features may result in such features single handedly causing the total weight to become below the threshold, leading to rejecting the occurrence of a fall condition.

As previously mentioned, the algorithm utilized to control operation of the valve 110 may also be designed to ensure operation of the hose 102 only when the ambient temperature is safe and to inhibit operation upon detecting the unsafe temperature condition.

Figure 5:
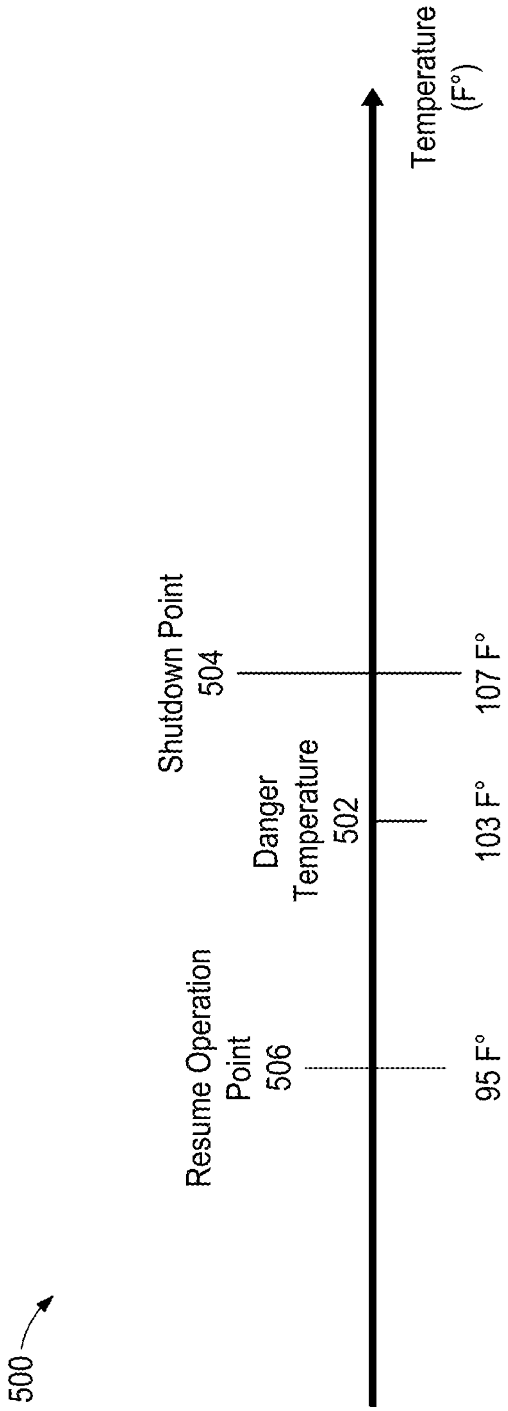
FIG. 5 depicts another example algorithm that may be utilized by the valve system of FIGS. 1-2, according to one or more additional embodiments of the present disclosure.

FIG. 5 depicts an example algorithm 500 for controlling operation based on the unsafe temperature condition, according to an example. In this example, the sensor 202 includes (at least) a temperature sensor and a humidity sensor, and the controller 204, when executing such algorithm, may utilize data captured by the temperature and humidity sensors as inputs to the algorithm for controlling operation of the valve 110. Utilizing the sensor 202 that incorporates a temperature sensor and humidity sensor may be beneficial in embodiments where the valve system 100 is controlled in part via heat index calculations, as detailed below, but in other embodiments, the humidity sensor may be omitted such that the sensor 202 may include just a temperature sensor.

The control algorithm may incorporate a Heat Index ("HI") calculation, which is a measure that combines humidity and temperature measurements to assess how the ambient temperature will feel to an operator or worker. In particular, the controller 204 may be configured to calculate the HI based on data received from the sensor 202. If, for example, the controller 204 executing the algorithm determines that the calculated HI exceeds a certain threshold temperature, the controller 204 emits a signal to close the valve 110, such that the operator is unable to continue operating the hose 102. The threshold temperature may represent a maximum safe temperature within which an operator may work. For example, the Occupational Safety and Health Administration (OSHA) of the U.S. government considers it dangerous for operators to work in ambient environments having HI exceeding 103° Fahrenheit ("°F") and, therefore, the HI threshold temperature may be set at 103° F. Thus, in this example, the algorithm incorporates a single threshold temperature, wherein the controller 204 causes the valve 110 to close the interior passageway 106 when the sensors 202 detect temperatures exceeding the threshold temperature. The controller 204 causes the valve 110 to open the interior passageway 106 when the sensors 202 detect that the temperature has fallen below the threshold temperature, indicating a safe working environment.

In the example depicted in FIG. 5, the algorithm 500 incorporates a plurality of threshold temperatures for controlling operation of the valve 110. By using different threshold temperatures for controlling when to close the valve 110 and when to re-open the valve 110, it is possible to inhibit minor temperature fluctuations from repeatedly opening and closing the valve 110 in quick succession. In the illustrated example, a dangerous temperature threshold 502 is set at 103° F. and a shutdown temperature threshold 504 is set at 107° F. The controller 204 may be configured to cause closure of the valve 110 upon detecting temperatures at or exceeding the shutdown temperature threshold 504. By setting the shutdown temperature threshold 504 at a higher temperature than the dangerous temperature threshold 502, the algorithm is able to account for measurement error, and ensure closure of the valve 110 only occurs for temperature related reasons when the ambient HI is actually at a dangerous level and not induced by measurement error.

The algorithm 500 further incorporates a resume operation threshold 506 that is below the dangerous temperature threshold 502. The controller 204 may be programmed to inhibit reopening of the valve 110 until temperatures at or below the resume operation threshold 506 are detected. Here, the resume operation threshold 506 is set at 95° F. In this manner, whether the hose 102 is allowed to operate in an ambient environment exhibiting a HI of 103° F. depends on whether this HI is reached from lower temperature, in which case the controller 204 will permit opening of the valve 110, or from temperatures at or above 107 F° where the opening of the valve 110 is not allowed.

In examples, the algorithm 500 may cause the sensor 202 to continuously take temperature and humidity readings, cause the controller 202 to continuously re-calculate the HI using the newly captured data from the sensor 202, and cause the controller 202 to compare the re-calculated HI values to the various threshold values stored in the memory 224. Thus, the algorithm 500, when executed by the controller 204, is configured to cause the valve 110 to maintain closure of the interior pathway 106 until the heat index value calculated by the controller 204 (using data captured by the sensor 202) is equal to or less than the resume operation threshold temperature 506.

Figure 6:
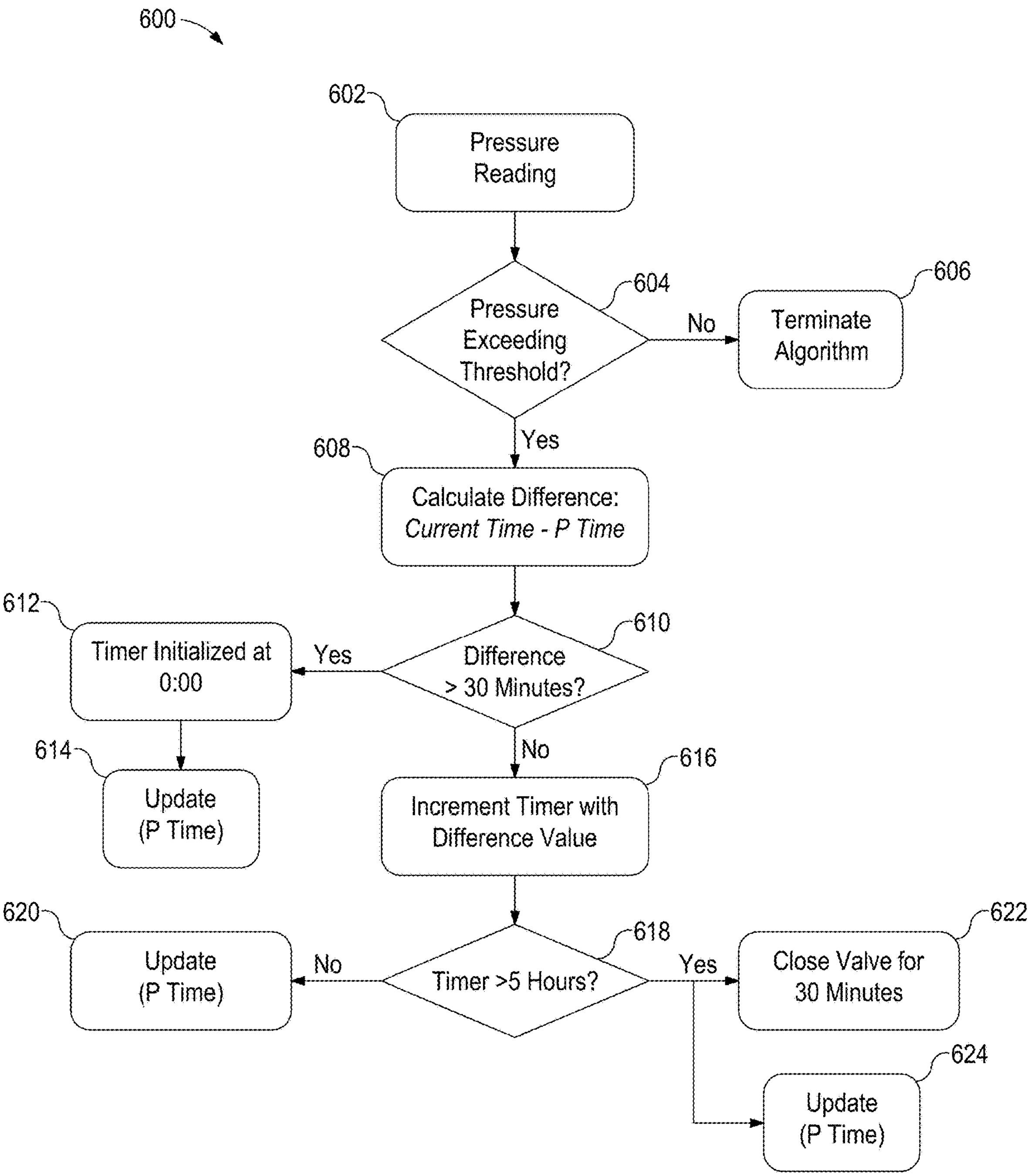
FIG. 6 depicts another example algorithm that may be utilized by the valve system of FIGS. 1-2, according to one or more additional embodiments of the present disclosure.

FIG. 6 illustrates another example algorithm 600 that may be executed by the controller 204 to detect the time interval condition, according to one or more additional embodiments of the present disclosure. As previously mentioned, the valve system 100 may be configured to close the valve 110 upon detecting that the operator has continuously used the hose 102 for the predetermined time period, to thereby prevent operator fatigue and influence operators to periodically take breaks from work. To detect when the hose 102 is being used and for how long, the valve system 100 may be equipped with a timer (e.g., the controller 204 may include a timer, such as a programming variable that updates once an update request is required by the algorithm) and the sensor 202 may include (at least) a pressure sensor. The controller 204 may analyze data captured by the pressure sensor and compare the captured pressure data to a threshold pressure value in order to determine when the hose 102 is being operated and to determine a start time for such operation. The controller 204 may cause closure of the valve 110 upon determining that the hose 102 has been operated for at least the predetermined time period.

In the illustrated example, the algorithm 600 is designed to impose a 30 minute break for every 5 hours that the valve system 100 is operated (i.e., 5 hours is the predetermined time period threshold). In this example, each reading from the pressure sensor triggers the algorithm as shown at 602, and then the algorithm 600 checks whether the pressure reading exceeds a certain threshold pressure, as shown at 604. This threshold pressure is indicative of the pressure of the fluid circulating through the hose 102 during normal operation and thus may depend on the specific application. If, at 604, the algorithm 600 determines that the pressure detected does not exceed the threshold pressure (i.e., which would indicate that the hose 102 is not pressurized), the algorithm 600 does not proceed further and terminates, as indicated at 606. If, at 604, the algorithm 600 determines that the pressure detected by the sensor 202 exceeds the threshold pressure, the algorithm 600 proceeds by calculating the difference between the "Current Time" and "P Time" (i.e., Current Time minus P Time), as indicated at 608, where P Time is the last recorded date/time where the pressure exceeded the threshold. For instance, if the hose 102 was operated on 1 Jan. 2023 at 6:20 AM, and then the hose 102 was operated again at 6:33 AM on the same day, P Time would be 6:20 AM on 1 Jan. 2023, whereas the Current Time is 6:33 AM on 1 Jan. 2023, and the difference between the Current Time and P Time calculated at 608 would be 13 minutes.

Since the goal of the algorithm 600 is to force the operator to take a 30 break for every 5 hours of work, the algorithm 600 determines whether the difference calculated at 608 is equal to or greater than 30 minutes, at 610. If so, the algorithm 600 resets the timer as shown at 612 and P Time is updated as shown at 614. However, if at 610 the algorithm 600 determines that the difference calculated at 608 is less than 30 minutes, the algorithm 600 increments the timer, as shown at 616.

Then, at 618, the algorithm 600 determines whether the total value of the timer exceeds the predetermined time period (e.g., 5 hours or some other maximum time period threshold). If not, the algorithm updates P Time, as shown at 620, and the valve 110 is allowed to remain open. However, if the algorithm 600 determines at 618 that the total value of the timer exceeds the predetermined time period, the controller 204 causes the valve 110 to close, as shown at 622, for a duration of time (e.g., for 30 minutes) to impose a break on the operator and mitigate chances of fatigue due to overwork. Also, when closing the valve 110, the algorithm will update P Time, as shown at 624.

The algorithm 600 may be utilized in a variety of utilization scenarios, such as where the operator, intending to remove the coating on a pipeline via the valve system 100, moves to the pipeline location and starts a test blasting on the ground using the valve system 100. However, the blast pressure may need further changes, leading to multiple pressurization & de-pressurization cycles of the valve system 100. Furthermore, during the blasting activity, the operator may need to change their position (e.g. drop below the pipeline) or may need changes to the scaffolding system on which they are standing when using the valve system 100. This process includes a lot of periods where the operator is working, but where the valve system 100 is not pressurized. The algorithm 600 captures the overall working time, which includes both the time that the valve system 100 is pressurized as well as some additional time with when the valve system 100 is not pressurized; and this means that certain time periods between pressurization events is considered part of the overall working time, unless amount of time between pressurization events exceeded a certain amount of time (e.g., the break period of 30 minutes), meaning the operator did not pressurize the hose 102 for 30 minutes straight or more, in which case it is assumed that the operator took a break and then the timer may be restarted. Thus, the algorithm 600 checks (at 610) whether the operator took a suitably long break and, if so, the timer is restarted (at 612) and the working time is re-initialized (at 614). However, if it is determined via the algorithm 600 that the operator did not take a break, the algorithm 600 proceeds to step 616.

As mentioned, the timer may be a programming variable that updates upon request by the algorithm 600. Accordingly, in a scenario where the operator started the work period by pressurizing the hose at 7:00 AM, because the hose 102 was not being utilized since the day before (i.e., the hose 102 wasn't operated at least in the period between 6:30 AM and 7:00 AM such that the difference is greater than 30 minutes), the algorithm 600 initially proceeds via steps 612 and 614, where the timer is set to a timer value of 0:00 and the period time, labeled as "P Time", is set to 7:00 AM. Following the initial values set, assume the operator continued blasting and pressurizing the hose 102 until 7:10 AM. During this time, all pressure readings were being passed through step 616 to step 620, as further described below. Once the operator stops blasting/pressurizing the hose 102 at 7:10 AM, the timer value will be 0:10 and "P Time" will be 7:10 AM. If, for example, the operator moved around until 7:15 AM and then started pressurizing the hose 102, both the timer value and the "P Time" will remain at 0:10 and 7:10 AM, respectively, because the algorithm 600 causes the timer value and "P Time" to update their values once the algorithm 600 requests an update. However, the algorithm 600 does not operate when the valve system 100 is not pressurized, as indicated at steps 604 to 606.

Pressurization of the hose 102 will cause the pressure in the hose 102 to exceed a threshold pressure (at 604), and immediately thereafter at 7:15 AM the algorithm 600 would operate as follows. At 608, the difference value will be 0:05, which is calculated as the difference between the current time (7:15) and the previous "P Time" (7:10). Because this difference is not greater than the break time (i.e., 30 minutes), the algorithm 600 moves to step 616. At 616, the timer still has a value of 0:10; however, in this step, the timer value (0:10) is to be incremented by the difference value (0:05). Therefore, at the end of step 616 in this example, the timer value becomes 0:15 and, because this timer value is not greater than 5 hours, the algorithm proceeds to step 620. At 620, "P Time" is still 7:10 initially, but it gets updated via step 620 to 7:15.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A valve system, comprising:

a hose configured to be held and controlled by an operator and defining a fluid pathway terminating in a fluid outlet;

a valve operable to inhibit flow out of the fluid outlet when in a closed position;

a sensor operable to sense an operator safety condition, the sensor being at least one of an accelerometer, a gyroscope, or a magnetometer, and the operator safety condition being at least one of an operator fall or a dropped hose; and a controller in communication with the sensor and operable to determine occurrence of the operator safety condition, wherein the controller is programmed to direct the valve to close and inhibit flow out of the fluid outlet upon determining occurrence of the operator safety condition.

2. The valve system of claim 1, wherein the valve system further comprises a memory storing instructions that, when executed by the controller, compare data captured by the sensor to a threshold value and cause the valve to close the fluid pathway if the data captured by the sensor exceeds the threshold value.

3. The valve system of claim 1, wherein the valve system further includes an additional sensor, wherein the additional sensor is at least one of a temperature sensor and a humidity sensor, and the valve system further comprises a memory storing instructions that, when executed by the controller:

calculate a heat index value using data captured by the sensor;

compare the heat index value to a shutdown threshold value stored in the memory; and cause the valve to close the fluid pathway when the heat index value exceeds the shutdown threshold value.

4. The valve system of claim 3, wherein a resume operation temperature threshold value is further stored in the memory, and the instructions, when executed by the controller cause the valve to maintain closure of the fluid pathway until the heat index value calculated by the controller is equal to or less than the resume operation threshold value.

5. The valve system of claim 1, wherein the valve system further includes an additional sensor, wherein the additional sensor comprises a pressure sensor, and the valve system further comprises a memory storing instructions that, when executed by the controller:

determine a start time by comparing pressure data captured by the pressure sensor to a threshold pressure value stored in the memory; and cause the valve to close the fluid pathway if the pressure data exceeds the threshold pressure value for a first predetermined time period.

6. The valve system of claim 5, wherein the instructions, when executed by the controller, further cause the valve to maintain closure of the fluid pathway for a second predetermined time period.

7. The valve system of claim 1, wherein the valve is a normally closed valve.

8. The valve system of claim 7, further comprising:

a first power supply for supplying power to the controller;

a second power supply for supplying power to the valve; and a relay, wherein the controller is operable to open or close the relay, and the second power source energizes the valve when the relay is closed.

9. The valve system of claim 1, further comprising a housing within which the sensor and the controller are disposed.

10. The valve system of claim 9, further comprising a base mountable to an exterior surface of the hose.

11. The valve system of claim 1, further comprising a display electronically connected to the controller and configured to display operational data about the valve.

12. The valve system of claim 1, further comprising a GPS transceiver operable to determine a location of the valve system and the hose.

13. A valve system, comprising:

a hose configured to be held and controlled by an operator and defining a fluid pathway terminating in a fluid outlet;

a base mountable to an exterior surface of the hose;

a housing operatively coupled to the base and containing one or more sensors and a controller in communication with the one or more sensors;

a valve in communication with the controller and operable to inhibit flow out of the fluid outlet when in a closed position, wherein the one or more sensors are operable to sense an operator safety condition of the hose, and the controller communicates with the one or more sensors to determine occurrence of the operator safety condition, and wherein the controller is programmed to direct the valve to close and inhibit flow out of the fluid outlet upon determining occurrence of the operator safety condition, and wherein the operator safety condition is at least one of an operator fall or a dropped hose.

14. The valve system of claim 13, further comprising a bridge extending between housing and the valve, the bridge defining an interior passageway through which wiring extends for communicably coupling the valve to the controller.

15. The valve system of claim 14, wherein the bridge is a flexible coupling member.

16. The valve system of claim 13, wherein the one or more sensors comprise at least one of an accelerometer, a gyroscope, and a magnetometer, and the operator safety condition further comprises a fall condition, and wherein, when the one or more sensors detect that the hose has fallen, the controller is programmed to direct the valve to close.

* * * * *